A. E. BOSSE.
DEVICE FOR DISTRIBUTING AIR.
APPLICATION FILED APR. 16, 1912.

1,082,492.

Patented Dec. 30, 1913.

Witnesses:
William S Atchison
Elizabeth J Blumer

Inventor:
Adolphe E. Bosse,
By Jas. C. Wobensmith
Attorney.

UNITED STATES PATENT OFFICE.

ADOLPHE E. BOSSÉ, OF PITTSBURGH, PENNSYLVANIA.

DEVICE FOR DISTRIBUTING AIR.

1,082,492.  Specification of Letters Patent.  Patented Dec. 30, 1913.

Application filed April 16, 1912. Serial No. 691,080.

*To all whom it may concern:*

Be it known that I, ADOLPHE E. BOSSÉ, a citizen of the United States, residing at Pittsburgh, in the county of Allegheny and State of Pennsylvania, have invented certain new and useful Improvements in Devices for Distributing Air, of which the following is a specification.

My invention relates to a device for distributing air for heating, ventilating and cooling purposes and it relates more particularly to a simple and inexpensive apparatus whereby the air for heating, ventilating and cooling purposes can be conducted and distributed throughout a room or other confined space.

The object of my invention is to provide a simple and inexpensive apparatus whereby the previously heated or cooled or fresh air may be carried to the desired parts of the room or other confined space and distributed evenly and uniformly and projected without appreciable drafts in the necessary direction to thereby secure the most efficient distribution of the air for the required purpose.

Figure 1:
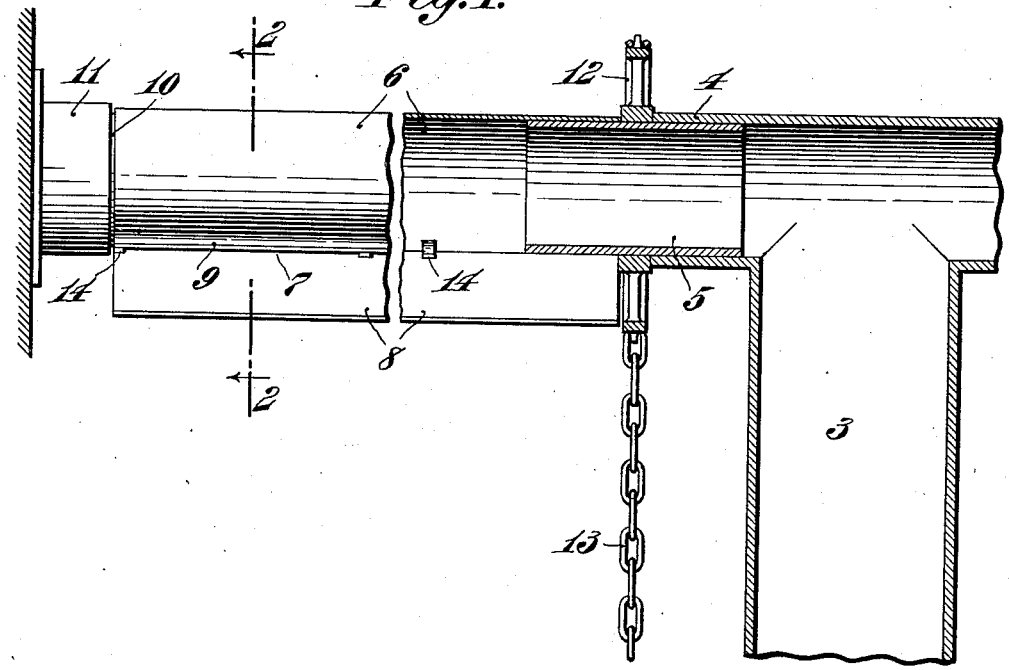
Figure 2:
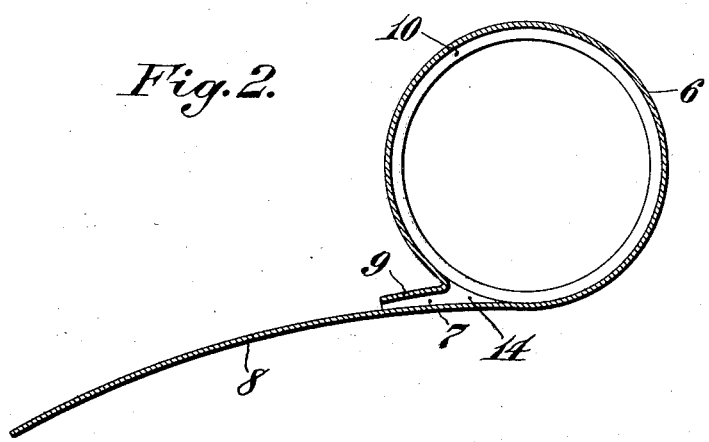

The nature and characteristic features of my invention will be more readily understood from the following description taken in connection with the accompanying drawings forming part hereof, in which:

Figure 1 is a front elevation, partly in section, of an apparatus for distributing air embodying the main features of my present invention; and Fig. 2 is a transverse section thereof, enlarged, taken on the line 2—2 of Fig. 1.

Referring to the drawings, in the particular embodiment of my invention therein shown, 3 is a vertical supply pipe leading from the source of supply or from the heating or cooling apparatus, not shown. The pipe 3 is provided at its top with a branch 4, preferably circular in cross section, and having journaled therein a short pipe or nipple 5. The pipe or nipple 5 is preferably made to fit snugly within the branch 4 so as to afford a certain amount of frictional resistance to prevent improper rotation of the distributing conduit proper, yet permitting the same to be adjusted when desired. On the projecting end of the pipe or nipple 5 is mounted one end of the distributing conduit 6 which is preferably made of sheet metal and having its main or body portion of circular cross section. In the periphery of the conduit 6 there is provided a slot 7 for the egress of the air. This slot is preferably formed by continuing a portion of the metal of which the conduit is composed tangentially for a considerable distance to provide a wing or apron 8 which is also preferably curvilinear in cross section. The inner portion of the wing or apron 8 forms one of the margins of the slot 7 and the other margin of said slot is formed by a lip 9 extending in a direction substantially parallel to that of the wing 8, but extending to a lesser extent.

One end of the distributing conduit is mounted on the pipe or nipple 5 while the other end is supported on a similar pipe or nipple 10 which is snugly journaled in a socket 11 or other suitable supporting device. It will be seen that the distributing conduit 6 is therefore capable of rotation in its supporting structure so that the slot 7 and the adjacent wing 8 may be rotated and brought to any desired angular position.

If desired the supporting pipe or nipple 5 may be provided with a sprocket wheel 12 over which may be mounted a chain 13 for the arbitrary rotation of the conduit 6 at any desired time and from any convenient location. At each end of the conduit 6 there is preferably arranged within the slot 7 a spacing block 14 which also serves to prevent the air from escaping sidewise. If desired these spacing blocks may also be soldered or otherwise secured within the slot 7 at various places along its length to stiffen the structure and prevent distortion of the same when subjected to torsional strain during the adjustment.

It should be noted that the slot 7 for the egress of the air is of a relatively small size so that the air will be distributed uniformly throughout the length of the conduit and that the wing 8 will serve to guide the air as it passes from the slot 7 and distribute the same in the desired direction in a smooth and uniform manner, but without objectionable drafts. For example when the device is used in the distribution of cold air, the conduit is usually arranged near the top of the room or chamber, and it is obvious that if the wing 8 was not provided the cold air would immediately descend instead of being distributed uniformly into the body of warm air at the top of the room or chamber. The wing 8 however prevents this immediate descent of the cold air as it will be projected by the lip 9 over the upper surface of the wing 8 where it will to a considerable extent intermingle with and reduce the temperature of the warmer air and thus effectually produce the desired cooling effect throughout the room without causing objectionable drafts in any particular direction. Of course when the device is used for the dissemination of warm air it will be placed in inverted position at the bottom of the room or chamber resulting in the increase of temperature in substantially the same manner.

Having thus described the nature and characteristic features of my invention, what I claim as new and desire to secure by Letters Patent is:—

1. A device for distributing air comprising a conduit having a narrow longitudinal slot for the egress of the air, and a wing extending outward from one of the margins of said slot.

2. A device for distributing air comprising a conduit having a narrow longitudinal slot for the egress of the air, a wing extending outward from one of the margins of said slot, and a lip extending outward from the other margin of said slot.

3. A device for distributing air comprising a conduit having a narrow longitudinal slot for the egress of the air, a wing extending outward tangentially from one of the margins of said slot, and a lip extending outward from the other margin of said slot in the same general direction as said wing but to a lesser extent.

4. A device for distributing air comprising a conduit having a narrow longitudinal slot for the egress of the air, a wing extending outward tangentially from one of the margins of said slot, a supply pipe, means for supporting the slotted conduit from said supply pipe in such manner as to permit rotation of said conduit to vary the angular location of the slot and projecting wing.

In testimony whereof I have hereunto signed my name in the presence of two witnesses.

ADOLPHE E. BOSSÉ.

Witnesses:
 WILLIAM S. ATCHISON,
 ELIZABETH J. BLOOMER.